United States Patent
Safaee

(10) Patent No.: US 12,218,515 B2
(45) Date of Patent: Feb. 4, 2025

(54) WIRELESS POWER SYSTEM WITH VOLTAGE REGULATION

(71) Applicant: Apple Inc., Cupertino, CA (US)

(72) Inventor: Alireza Safaee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/503,389

(22) Filed: Nov. 7, 2023

(65) Prior Publication Data
US 2024/0072573 A1 Feb. 29, 2024

Related U.S. Application Data

(63) Continuation of application No. 17/313,589, filed on May 6, 2021, now Pat. No. 11,876,383.

(60) Provisional application No. 63/123,931, filed on Dec. 10, 2020.

(51) Int. Cl.
*H02J 50/10* (2016.01)
*H02J 50/80* (2016.01)

(52) U.S. Cl.
CPC .............. *H02J 50/10* (2016.02); *H02J 50/80* (2016.02)

(58) Field of Classification Search
CPC ................................. H02J 50/10; H02J 50/80
USPC .......................... 320/108, 109, 113, 115, 135
See application file for complete search history.

(56) References Cited

U.S. PATENT DOCUMENTS

| | | | |
|---|---|---|---|
| 5,325,283 A * | 6/1994 | Farrington | H02M 3/01 363/21.03 |
| 5,426,579 A * | 6/1995 | Paul | G05F 1/70 323/299 |
| 6,664,767 B2 * | 12/2003 | Takahashi | H02P 9/305 322/17 |
| 7,518,896 B2 * | 4/2009 | Cheah | H02M 7/2176 323/266 |
| 8,487,481 B2 | 7/2013 | Cook et al. | |
| 9,325,201 B1 | 4/2016 | Aronov et al. | |
| 9,985,442 B2 | 5/2018 | Von Novak, III et al. | |
| 10,186,907 B2 | 1/2019 | Vitali et al. | |
| 10,418,905 B1 | 9/2019 | Perry et al. | |
| 10,439,502 B2 * | 10/2019 | Markhi | H02M 3/33592 |
| 10,498,171 B2 | 12/2019 | Radke | |

(Continued)

FOREIGN PATENT DOCUMENTS

JP  3317950 B2 *  8/2002  ............. H02M 1/34

OTHER PUBLICATIONS

Chen et al., Chinese Patent Document No. CN-105305795-A, published Feb. 3, 2016, 3 pages including abstract, claims and 1 drawing. (Year: 2016).*

(Continued)

*Primary Examiner* — Phallaka Kik
(74) *Attorney, Agent, or Firm* — Treyz Law Group; Jason Tsai

(57) ABSTRACT

A wireless charging system having a power transmitting device may wirelessly transfer power to a power receiving device. The power receiving device may include a voltage regulator that operates independently from the power transmitting device. The voltage regulator may output a rectified voltage and may activate pull-down rectifier switches during zero voltage crossings to boost the rectified voltage. The power receiving device may send control error packets to the power transmitting device to direct the power transmitting device to adjust the transmit power level.

20 Claims, 8 Drawing Sheets

(56) References Cited

U.S. PATENT DOCUMENTS

| | | | |
|---|---|---|---|
| 10,608,470 B2 | 3/2020 | Ren et al. | |
| 10,734,842 B2 | 8/2020 | Karalis et al. | |
| 10,873,215 B2 | 12/2020 | Kim et al. | |
| 11,387,676 B2* | 7/2022 | Ng | H02M 1/36 |
| 11,876,383 B1* | 1/2024 | Safaee | H02J 50/10 |
| 11,912,147 B2* | 2/2024 | Eull | H02J 7/06 |
| 2001/0009516 A1* | 7/2001 | Kato | H02M 1/34 |
| | | | 363/17 |
| 2003/0156437 A1 | 8/2003 | Gruening | |
| 2004/0218406 A1 | 11/2004 | Jang et al. | |
| 2005/0151515 A1* | 7/2005 | Isurin | H02P 9/305 |
| | | | 322/28 |
| 2007/0290659 A1 | 12/2007 | Bormann | |
| 2008/0112198 A1* | 5/2008 | Cheah | H02M 7/2176 |
| | | | 363/84 |
| 2012/0229044 A1* | 9/2012 | Nerone | H05B 45/38 |
| | | | 315/210 |
| 2014/0104891 A1 | 4/2014 | Kim et al. | |
| 2017/0093167 A1 | 3/2017 | Von Novak, III et al. | |
| 2017/0093168 A1 | 3/2017 | Von Novak, III et al. | |
| 2018/0090993 A1* | 3/2018 | Markhi | H02M 3/33592 |
| 2019/0006885 A1 | 1/2019 | Danilovic | |
| 2019/0044381 A1 | 2/2019 | Valtysson | |
| 2019/0393731 A1 | 12/2019 | Maniktala | |
| 2020/0006988 A1 | 1/2020 | Leabman | |
| 2020/0099257 A1* | 3/2020 | Qiu | H02J 7/00712 |
| 2021/0091598 A1* | 3/2021 | Ng | H02M 1/36 |
| 2021/0261009 A1 | 8/2021 | Eull et al. | |

OTHER PUBLICATIONS

Chen et al., Chinese Patent Doucment No. CN-203734548-U, published Jul. 23, 2014, 3 pages including abstract, claims and 1 drawing. (Year: 2014).*

Ahn et al., "Wireless Power Transfer With Automatic Feedback Control of Load Resistance Transformation, IEEE Transactions on Power Electronics," Nov. 2016, pp. 7876-7886, vol. 31, No. 11, IEEE Xplore.

Gougheri at al., "Current-Based Resonant Power Delivery With Multi-Cycle Switching for Extended-Range Inductive Power Transmission," IEEE Transactions on Circuits and Systems-1: Regular Papers, Sep. 2016, pp. 1543-1552, vol. 63, No. 9, IEEE Xplore.

Lovison et al., "Secondary-side-only Control for Smooth Voltage Stabilization in Wireless Power Transfer Systems with Constant Power Load," The 2018 International Power Electronics Conference, 2018, pp. 77-83, The University of Tokyo, Tokyo, Japan.

Zou et al., "Secondary Active Rectifier Control Scheme for a Wireless Power Transfer System with Double-Sided LCC Compensation Topology," 2018, pp. 2145-2150, University of Maryland, Oak Ridge National Laboratory, Knoxville, TN.

Baiyi et al., "Practical method for self-adaptive voltage stabilising of high-frequency wireless power transfer system, IET Power Electronics," Dec. 2, 2019, pp. 936-941, vol. 13 Iss. 5, The Institution of Engineering and Technology, Fuzhou University, China.

Liu et al., "An Overview of Regulation Topologies in Resonant Wireless Power Transfer Systems for Consumer Electronics or Bio-Implants," Energies, Jul. 2, 2018, pp. 1-22, MDPI, Basel, Switzerland.

* cited by examiner

WIRELESS POWER SYSTEM WITH VOLTAGE REGULATION

This application is a continuation of patent application Ser. No. 17/313,589, filed May 6, 2021, which claims the benefit of provisional patent application No. 63/123,931, filed Dec. 10, 2020, which are hereby incorporated by reference herein in their entireties.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a battery-powered, portable electronic device. The wireless power transmitting device has a coil that produces electromagnetic flux. The wireless power receiving device has a coil and rectifier circuitry that uses electromagnetic flux produced by the transmitter to generate direct-current power that can be used to power electrical loads in the battery-powered portable electronic device. It can be challenging to design a wireless charging system.

SUMMARY

A wireless power system has a wireless power transmitting device that uses an inverter to supply alternating-current signals at a carrier frequency to a coil and thereby transmit wireless power signals to a wireless power receiving circuit of a wireless power receiving device. The transmitted wireless power signals may be used to charge a battery in the power receiving device.

In some embodiments, a wireless power receiving device can include: a wireless charging coil having a first coil terminal and a second coil terminal; a rectifier having rectifier switches, a first rectifier input coupled to the first coil terminal, a second rectifier input coupled to the second coil terminal, and a rectifier output on which a rectifier output voltage is generated; a rectifier controller configured to control the rectifier switches; a capacitor having a first terminal coupled to the first rectifier input and a second terminal coupled to the second rectifier input; and voltage regulator circuitry configured to receive a voltage across the capacitor, to receive the rectifier output voltage, and to override the rectifier controller by activating a subset of the rectifier switches when the voltage across the capacitor is equal to zero.

The voltage regulator circuitry can include: a zero crossing detection circuit configured to detect when the voltage across the capacitor is equal to zero, where the voltage regulator circuitry is further configured to activate the subset of the rectifier switches upon detecting that the rectifier output voltage is below a threshold and that the voltage across the capacitor is equal to zero; a pulse generation circuit configured to generate a pulse signal in response to the zero crossing detection circuit detecting that the voltage across the capacitor is equal to zero; an integration circuit configured to receive the pulse signal and to generate a corresponding ramp signal; a difference circuit configured to receive the rectifier output voltage, to receive a rectifier set point voltage, and to generate an error voltage; a proportional integration controller configured to receive the error voltage and to generate a proportional integrator output voltage; and an operational amplifier having a first input configured to receive the proportional integrator output voltage, a second input configured to receive the ramp signal, and an output that is coupled to the rectifier.

The wireless power receiving device can further include a synchronous rectifier controller configured to control pull-down switches and pull-up switches within the rectifier. The wireless power receiving device can further include a data transmitter configured to transmit a control error packet to a wireless power transmitting device. The control error packet can direct the wireless power transmitting device to adjust an amount of wireless power being transferred to the wireless charging coil. The control error packet regulates the rectifier output voltage at a first speed, whereas the voltage regulator circuitry regulates the rectifier output voltage at a second speed greater than the first speed.

In accordance with some embodiments, a method of operating a wireless power receiving device is provided that includes: using a wireless charging coil to receive wireless power from a wireless power transmitting device; using a rectifier having rectifier inputs coupled to the wireless charging coil to generate a rectifier output voltage, where a capacitor is coupled across the rectifier inputs; using a synchronous rectifier controller to control switches within the rectifier; using voltage regulator circuitry to receive a voltage from the capacitor and to receive the rectifier output voltage; and using the voltage regulator circuitry to activate a subset of the switches by overriding the synchronous rectifier controller when the received voltage is equal to zero. Only pull-down switches within the rectifier are activated without activating any pull-up switches within the rectifier when the received voltage is equal to zero.

In accordance with some embodiments, a wireless power receiving device is provided that includes: a wireless charging coil having a first coil terminal and a second coil terminal; a rectifier having a first pull-down switch, a second pull-down switch, a first pull-up switch, and a second pull-up switch; a capacitor having a first terminal coupled to a first node between the first pull-down switch and the first pull-up switch and having a second terminal coupled to a second node between the second pull-down switch and the second pull-up switch; and voltage regulator circuitry configured to receive a voltage across the capacitor and a rectifier output voltage output from the rectifier. The voltage regulator circuitry can be configured to raise the rectifier output voltage closer to a set point voltage level by activating the pull-down switches without activating the pull-up switches when the voltage across the capacitor crosses zero volt. The wireless power receiving device can further include a data transmitter configured to send, via the wireless charging coil, a control error packet to a wireless power transmitting device. The control error packet can cause the wireless power transmitting device to increase a wireless power level so that the rectifier output voltage rises further towards the set point voltage level.

DETAILED DESCRIPTION

A wireless power system includes a wireless power transmitting device. The wireless power transmitting device wirelessly transmits power to one or more wireless power receiving devices. The wireless power receiving devices may include electronic devices such as wristwatches, cellular telephones, tablet computers, laptop computers, ear buds, battery cases for ear buds and other devices, tablet computer styluses (pencils) and other input-output devices, wearable devices, or other electronic equipment. The wireless power transmitting device may be an electronic device such as a wireless charging mat or puck, a tablet computer or other battery-powered electronic device with wireless power transmitting circuitry, or other wireless power transmitting device. The wireless power receiving devices use power from the wireless power transmitting device for powering internal components and for charging an internal battery. Because transmitted wireless power is often used for charging internal batteries, wireless power transmission operations are sometimes referred to as wireless charging operations.

Figure 1A:
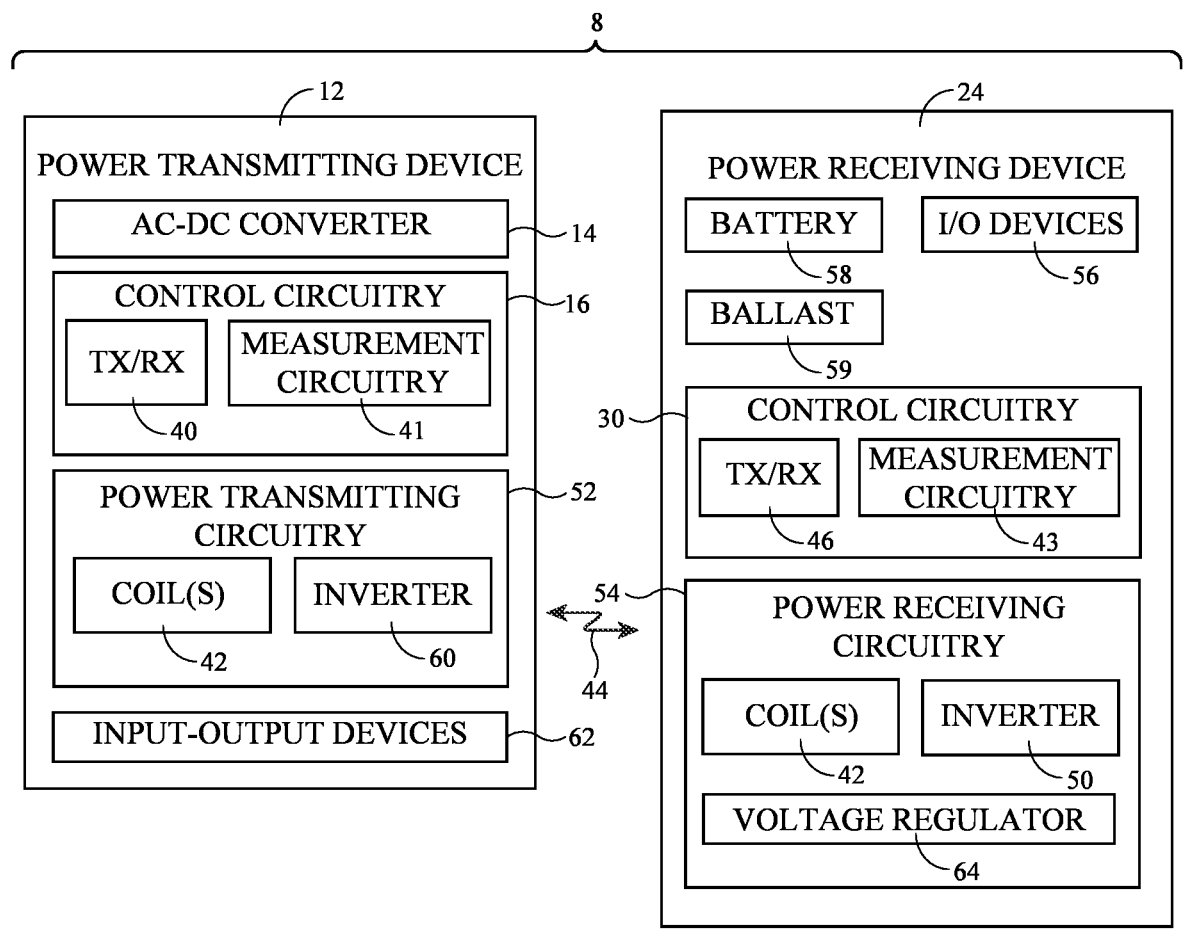
FIG. 1A is a block diagram of an illustrative wireless charging system that includes a wireless power transmitting device and a wireless power receiving device in accordance with some embodiments.

An illustrative wireless power system, sometimes referred to as a wireless charging system, is shown in FIG. 1A. As shown in FIG. 1A, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, application processors, digital signal processors, microcontrollers, and/or application-specific integrated circuits with processing circuits. The processing circuitry implements desired control and communications features in devices 12 and 24.

For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8. As another example, the processing circuitry may include one or more processors such as an application processor that is used to run software such as internet browsing applications, voice-over-internet-protocol (VOIP) telephone call applications, email applications, media playback applications, operating system functions, power management functions for controlling when one or more processors wake up, game applications, maps, instant messaging applications, payment applications, calendar applications, notification/reminder applications, etc.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors such as an application processor, a central processing unit (CPU) or other processing circuitry.

Wireless power transmitting device 12 may be a stand-alone power adapter (e.g., a wireless charging mat or puck that includes power adapter circuitry), may be a wireless charging mat or puck that is coupled to a power adapter or other equipment by a cable, may be a battery-powered electronic device (cellular telephone, tablet computer, laptop computer, removable case, etc.), may be equipment that has been incorporated into furniture, a vehicle, or other system, or may be other wireless power transfer equipment. Illustrative configurations in which wireless power transmitting device 12 is a wireless charging puck or battery-powered electronic device are sometimes described herein as an example.

Wireless power receiving device 24 may be a portable electronic device such as a wristwatch, a cellular telephone, a laptop computer, a tablet computer, an accessory such as an earbud, a tablet computer input device such as a wireless tablet computer stylus (pencil), a battery case, or other electronic equipment. Wireless power transmitting device 12 may be coupled to a wall outlet (e.g., an alternating current power source), may have a battery for supplying power, and/or may have another source of power. Device 12 may have an alternating-current (AC) to direct-current (DC) power converter such as AC-DC power converter 14 for converting AC power from a wall outlet or other power source into DC power.

In some configurations, AC-DC power converter 14 may be provided in an enclosure (e.g., a power brick enclosure) that is separate from the enclosure of device 12 (e.g., a wireless charging puck enclosure or battery-powered electronic device enclosure) and a cable may be used to couple DC power from the power converter to device 12. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42. Coils 42 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, battery-powered device, etc.) may have only a single coil. In other arrangements, wireless charging device 12 may have multiple coils (e.g., two or more coils, 5-10 coils, at least 10 coils, 10-30 coils, fewer than 35 coils, fewer than 25 coils, or other suitable number of coils).

As the AC currents pass through one or more coils 42, the coils 42 produce electromagnetic field signals 44 in response to the AC current signals. Electromagnetic field signals (sometimes referred to as wireless power signals) 44 can then induce a corresponding AC current to flow in one or more nearby receiver coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic field 44) from coil 48 into DC voltage signals for powering loads in device 24 such powering application processors as well as charging a battery in the device. This principle of wireless power transfer can be referred to as the transmitting and receiving of wireless power signals.

The DC voltages produced by rectifier 50 can be used in powering an energy storage device such as battery 58 and can be used in powering other components in device 24. For example, device 24 may include input-output devices 56 such as a display, touch sensor, communications circuits, audio components, sensors, components that produce electromagnetic signals that are sensed by a touch sensor in tablet computer or other device with a touch sensor (e.g., to provide stylus (pencil) input, etc.), and other components and these components may be powered by the DC voltages produced by rectifier 50 (and/or DC voltages produced by battery 58 or other energy storage device in device 24). Wireless power transmitting device 12 may also include one or more input-output devices 62 (e.g., input devices and/or output devices of the type described in connection with input-output devices 56) or input-output devices 62 may be omitted (e.g., to reduce device complexity). In addition to battery 58, device 24 may also include an adjustable load such as ballast load 59. Ballast load 59 may be used to help ensure that there is always a constant load at the output of rectifier 50, even before the charging circuitry for battery 58, the display, input-output output devices 56, or control circuitry 30 begin to draw significant current. Ballast load 59 may therefore serve as an adjustable current sink to support operations on device 24.

Power receiving circuitry 54 may further include voltage regulator circuitry such as voltage regulator 64 that helps stabilize the rectified voltage produced by rectifier 50 during the operation of system 8. Ballast 59 can sometimes be considered to be part of or a type of voltage regulator circuitry. Voltage regulator 64 may, for example, be used to regulate the rectified voltage in response to a load step change such that the change in rectified power output by rectifier 50 is proportional to the amount of the load step change. Voltage regulator 64 may operate independently from power transmitting device 12 (e.g., voltage regulator 64 can boost the rectified voltage without having to actively increase the power level of wireless power signals 44).

During wireless power transfer operations, wireless transceiver circuitry 40 can use one or more coils 42 to transmit in-band signals to wireless transceiver circuitry 46 that are received by wireless transceiver circuitry 46 using coil 48. Suitable modulation schemes may support communications between device 12 and device 24. With one illustrative configuration, frequency-shift keying (FSK) is used to convey in-band data from device 12 to device 24 and amplitude-shift keying (ASK) is used to convey in-band data from device 24 to device 12. In some embodiments, FSK conveys data in both directions between devices 12 and 24. Power may be conveyed wirelessly from device 12 to device 24 during these FSK and ASK transmissions. Other types of in-band communications may be used, if desired.

During wireless power transmission operations, circuitry 52 supplies AC drive signals to one or more coils 42 at a given power transmission frequency (sometimes referred to as a carrier frequency, power carrier, or drive frequency). The power carrier frequency may be, for example, a predetermined frequency of about 125 kHz, about 128 kHz, about 200 kHz, about 326 kHz, about 360 kHz, at least 80 kHz, at least 100 kHz, less than 500 kHz, less than 300 kHz, or other suitable wireless power frequency. Devices operating under the Qi wireless charging standard established by the Wireless Power Consortium generally operate between 110-205 kHz or between 80-300 kHz. In some configurations, the power transmission frequency may be negotiated in communications between devices 12 and 24. In other configurations, the power transmission frequency is fixed.

Figure 1B:
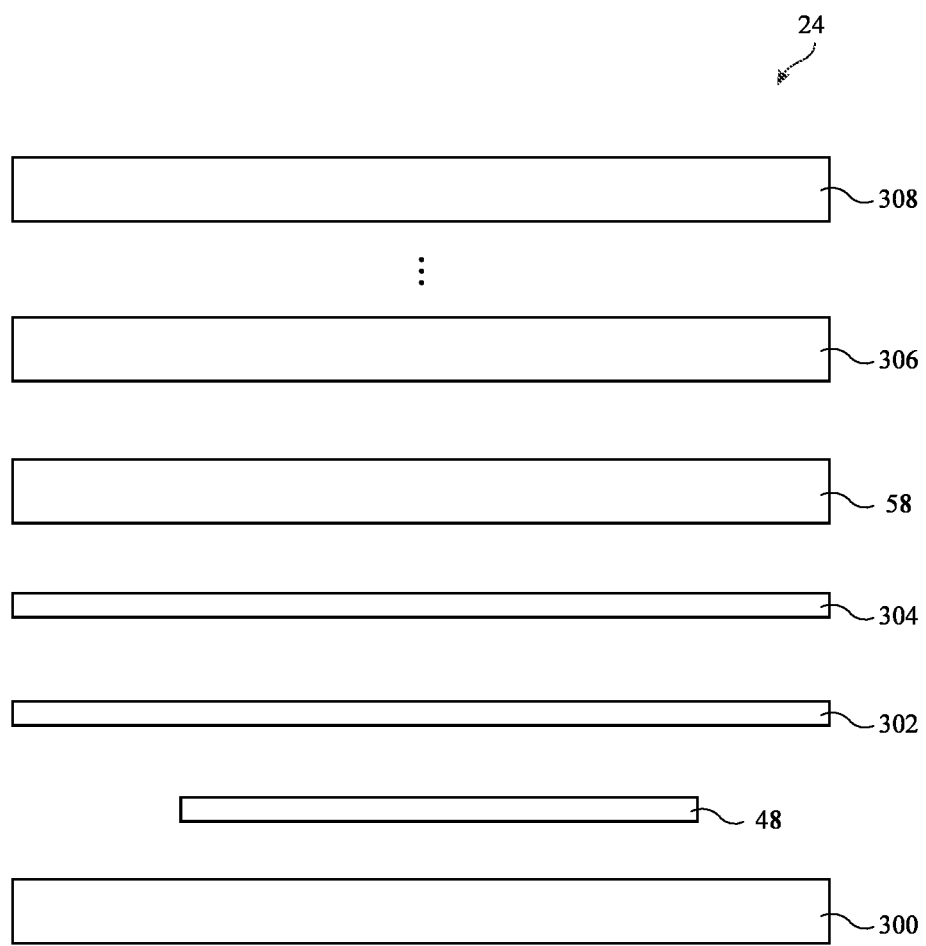
FIG. 1B is an exploded view of an illustrative wireless power receiving device in accordance with some embodiments.

FIG. 1B shows an exploded view of power receiving device 24. As shown in FIG. 1B, power receiving device 24 may include a device housing such as housing layer 300, coil 48 disposed over housing 300, shielding layers 302 and 304, battery 58 disposed over the shielding layers, a display layer such as display 306 disposed over battery 58, and a cover layer such as cover glass 308 disposed over display 306. Device housing 300 and cover glass 308 serve as lower and upper external protective layers, respectively.

Housing 300, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 300 may be formed using a unibody configuration in which some or all of housing 300 is machined or molded as a single structure or may be formed using multiple structures (e.g., an internal frame structure, one or more structures that form exterior housing surfaces, etc.). Cover glass 308 may be formed from crystalline material such as sapphire, ceramic, or other chemically strengthened glass material that is transparent and allows the user to view the content output by display 306.

Electronic components within device 24 such as circuitry on a printed circuit board within device 24 or circuitry within display 306 are subject to signal interference. Shielding layer 302 can be a metal shield configured to suppress electromagnetic interference. Shielding layer 302 of this type can be formed from materials such as copper, nickel, silver, gold, other metals, a combination of these materials, or other suitable conductive material that suppress signals at radio frequencies and may sometimes be referred to as radio-frequency shields.

Shielding layer 304 may be configured to suppress magnetic fields at relatively lower frequencies. Layer 304 may be a layer of magnetic material that can serve as a magnetic shield (i.e., layer 304 can block magnetic flux and may have a relative permeability of 500 or more 1000 or more, or other suitable value). An example of a magnetic material that can be used in forming magnetic shielding layer 304 is ferrite. Another example of a magnetic material that can be used in forming magnetic shielding layer 304 is a high permeability nickel-iron magnetic alloy that is sometimes referred to as mu-metal or permalloy.

If desired, battery 58 may serve as an additional electromagnetic shielding component interposed between coil 48 and display 306. Display 306 may be a touchscreen display that includes both display components (e.g., an array of display pixels and associated display driver circuitry) and touch sensor components (e.g., an array of touch sensor electrodes overlapping with the array of display pixel and associated touch sensing circuitry). Although not explicitly shown, additional printed circuit board(s), communications circuitry, other storage and processing components may be included within the stackup of device 24. The order of the layers shown in FIG. 1B is merely illustrative and is not intended to limit the scope of the present embodiments.

Figure 2:
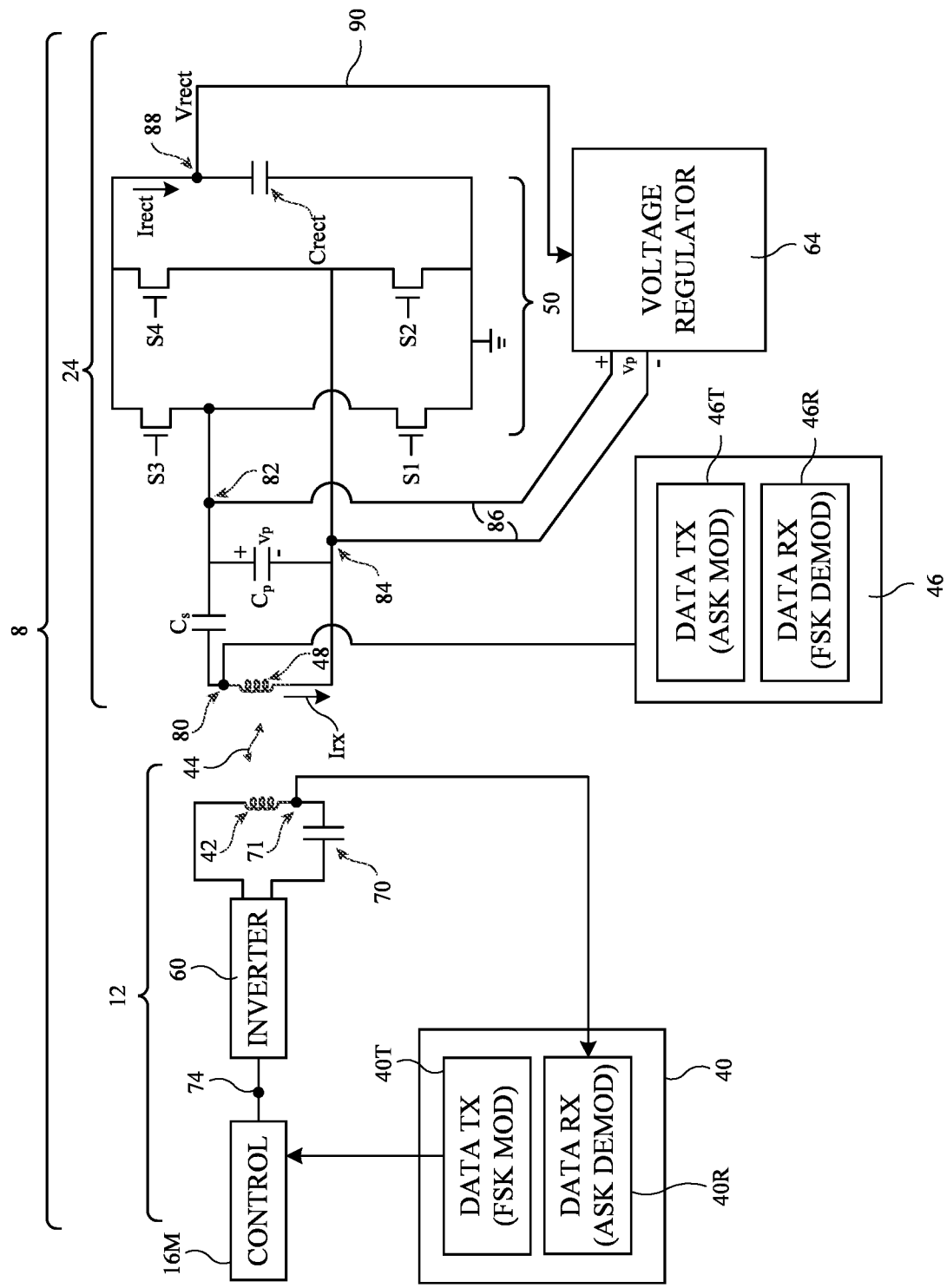
FIG. 2 is a circuit schematic of wireless power transmitting and receiving circuitry in accordance with an embodiment.

Data can be transmitted from device 12 to device 24 using frequency shift keying (FSK) or other suitable modulation scheme. During wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. As shown in FIG. 2, FSK modulator 40T may modulate the power transmission frequency that is being supplied by controller 16M to input 74 of inverter 60. Operated in this way, FSK data is transmitted from device 12 to device 24.

In device 24, coil 48 is used to receive signals 44. Power receiving circuitry 54 uses the received signals on coil 48 and rectifier 50 to produce DC power. At the same time, wireless transceiver circuitry 46 (e.g., FSK demodulator 46R) uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48. Transceiver circuitry 46 may be coupled to a node 80 between coil 48 and series capacitor Cs.

In-band communications between device 24 and device 12 uses ASK modulation and demodulation techniques. Wireless transceiver circuitry 46 includes ASK modulator 46T coupled to coil 48 to modulate the impedance of power receiving circuitry 54 (e.g., to adjust the impedance at coil 48). This, in turn, modulates the amplitude of signal 44 and the amplitude of the AC signal passing through coil(s) 42. ASK demodulator 40R monitors the amplitude of the AC signal passing through coil(s) 42 and, using ASK demodulation, extracts the transmitted in-band data from these signals that was transmitted by wireless transceiver circuitry 46. ASK demodulator 40R may be coupled to a node 71 between coils 42 and capacitor 70 or may be coupled to some other node in power transmitting circuitry 52. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

These communications are modulated at a carrier frequency such as the operating frequency used to provide wireless power during active wireless power transfer mode. Devices operating under the Qi wireless charging standard established by the Wireless Power Consortium generally operate between 110-205 kHz or 80-300 kHz. Frequencies of about 125 kHz, about 128 kHz, about 200 kHz, about 326 kHz, about 360 kHz, at least 80 kHz, at least 100 kHz, less than 500 kHz, less than 300 kHz, or other suitable wireless power frequency are also possible.

Power transmitting circuitry 52 may use inverter 60 or other drive circuit that produces wireless power signals that are transmitted through an output circuit that includes one or more coils 42 and capacitors such as capacitor 70. Control signals for inverter 60 are provided by control circuitry 16 at control input 74. A single coil 42 is shown in the example of FIG. 2, but multiple coils 42 may be used, if desired. During wireless power transmission operations, transistors in inverter 60 are driven by AC control signals from control circuitry 16 (e.g., controller 16M supplies drive signals for inverter 60 at input 74 at a desired alternating-current carrier frequency). This causes the output circuit formed from coil 42 and capacitor 70 to produce alternating-current electromagnetic fields (signals 44) that are received by wireless power receiving circuitry 54 formed from coil 48 in device 24.

Rectifier 50 converts received power from AC to DC and supplies a corresponding direct current output voltage Vrect at rectifier output terminal 88 for powering load circuitry in device 24 (e.g., for charging battery 58, for powering a display and/or other input-output devices 56, and/or for powering other load circuitry). Capacitance Crect may represent the output capacitance of rectifier 50 or the capacitance of the load being driven. In the example of FIG. 2, rectifier 50 may be a full-wave synchronous rectifier circuit having switches S1-S4 (e.g., metal-oxide-semiconductor field effect transistors). Switch S1 is coupled between node 82 and a ground line. Switch S2 is coupled between node 84 and the ground line. Switch S3 is coupled between node 82 and the rectifier output terminal 88. Switch S4 is coupled between node 84 and output terminal 88. A parallel capacitor such as capacitor Cp may be coupled across nodes 82 and 84. Nodes 82 and 84 may be connected to inputs of rectifier 50 (e.g., the node between switches S1 and S3 may be a first input of rectifier 50, whereas the node between switches S2 and S4 may be a second input of rectifier 50). The voltage across parallel capacitor Cp is denoted as voltage Vp.

In practice, the rectified voltage Vrect should remain within an operating range specified by power receiving device 24. The Qi mechanism for controlling the transmit power level uses the power receiving device 24 to send to power transmitting device 12 power adjustment requests such as ASK modulated packets sometimes referred to as a control error packet (CEP). The CEP feedback mechanism is open loop and sometimes take more than 800 switching cycles to finish transmitting, which is oftentimes too slow to provide sufficient regulation of Vrect. When Vrect is not properly regulated, an increase in load current (see Irect flowing into rectifier output terminal 88) will not be followed by a proportional change in the rectified power, resulting in conduction loss. When Vrect is not properly regulated, a large reduction in load current Irect can also cause an undesirable spike in Vrect. These scenarios impose major limitations on the design of device 24 to limit the rate of change of the rectified power level.

In accordance with an embodiment, power receiving device 24 may be provided with local voltage regulation circuitry such as voltage regulator 64. As shown in FIG. 2, voltage regulator 64 may have one input configured to receive the rectified voltage Vrect via line 90 and another input configured to receive voltage Vp via path 86. Path 86 may include a first line coupled to node 82 and a second line coupled to node 84. Voltage regulator 64 provides fast voltage regulation (relative to the latency of the CEP feedback mechanism) without having to send feedback signals back to power transmitting device 12. Voltage regulator 64 operates independently from power transmitting device 12, which provides better voltage regulation and better over voltage protection (e.g., substantially reduced probability of exceeding voltage limits during a load release event), thus alleviating major design restrictions by allowing much higher rates of system load changes. Voltage regulator 64 can be used in conjunction with the CEP regulation loop and can help increase the power capability of the overall wireless charging system.

Figure 3:
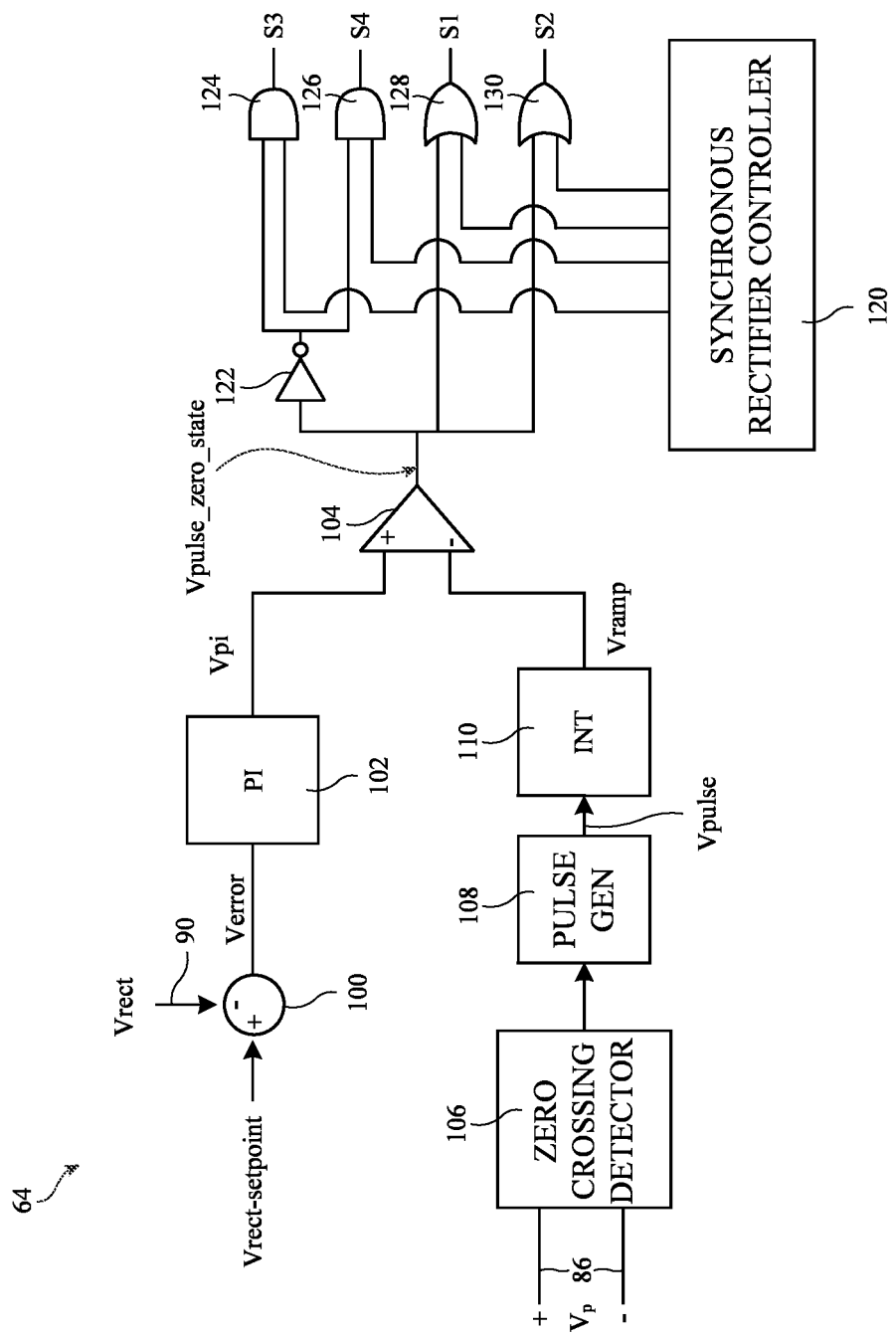
FIG. 3 is a diagram of illustrative voltage regulator circuitry in accordance with some embodiments.

FIG. 3 is a diagram of illustrative voltage regulator circuitry 64. As shown in FIG. 3, voltage regulator circuitry 64 may include a difference circuit such as difference circuit 100, a proportional integration control circuit such as proportional integrating (PI) controller 102, an operational amplifier circuit such as operational amplifier 104, a zero crossing detection circuit such as zero crossing detector 106, a pulse generation circuit such as pulse generator 108, an integration circuit such as integrator 110, and associated logic gates such as logic gates 122, 124, 126, 128, and 130.

Difference circuit 100 has a first (+) input configured to receive a rectifier set point voltage Vrect-setpoint, a second (−) input configured to receive rectified voltage Vrect from line 90, and an output on which error voltage Verror is generated. Error voltage Verror may be equal to the difference between voltage Vrect-setpoint and voltage Vrect. Difference circuit 100 is therefore sometimes referred to as a subtraction circuit or a subtractor. Voltage regulator 64 keeps voltage Vrect close to Vrect-setpoint (sometimes referred to as the target rectifier voltage level or a threshold voltage level). Voltage Vrect-setpoint may be a fixed voltage level or a dynamically adjustable voltage level. Voltage Vrect-setpoint may be equal to 11 V, 11.5 V, 12 V, 12.5 V, 13 V, 13.5 V, 14 V, 11-14 V, less than 11 V, greater than 14 V, 2-11 V, 14-20 V, or other suitable target regulated voltage level. Proportional integrating controller 102 receives error voltage Verror from difference circuit 100 and generates a corresponding output voltage Vpi (sometimes referred to as a proportional integrator output voltage).

Figure 4:
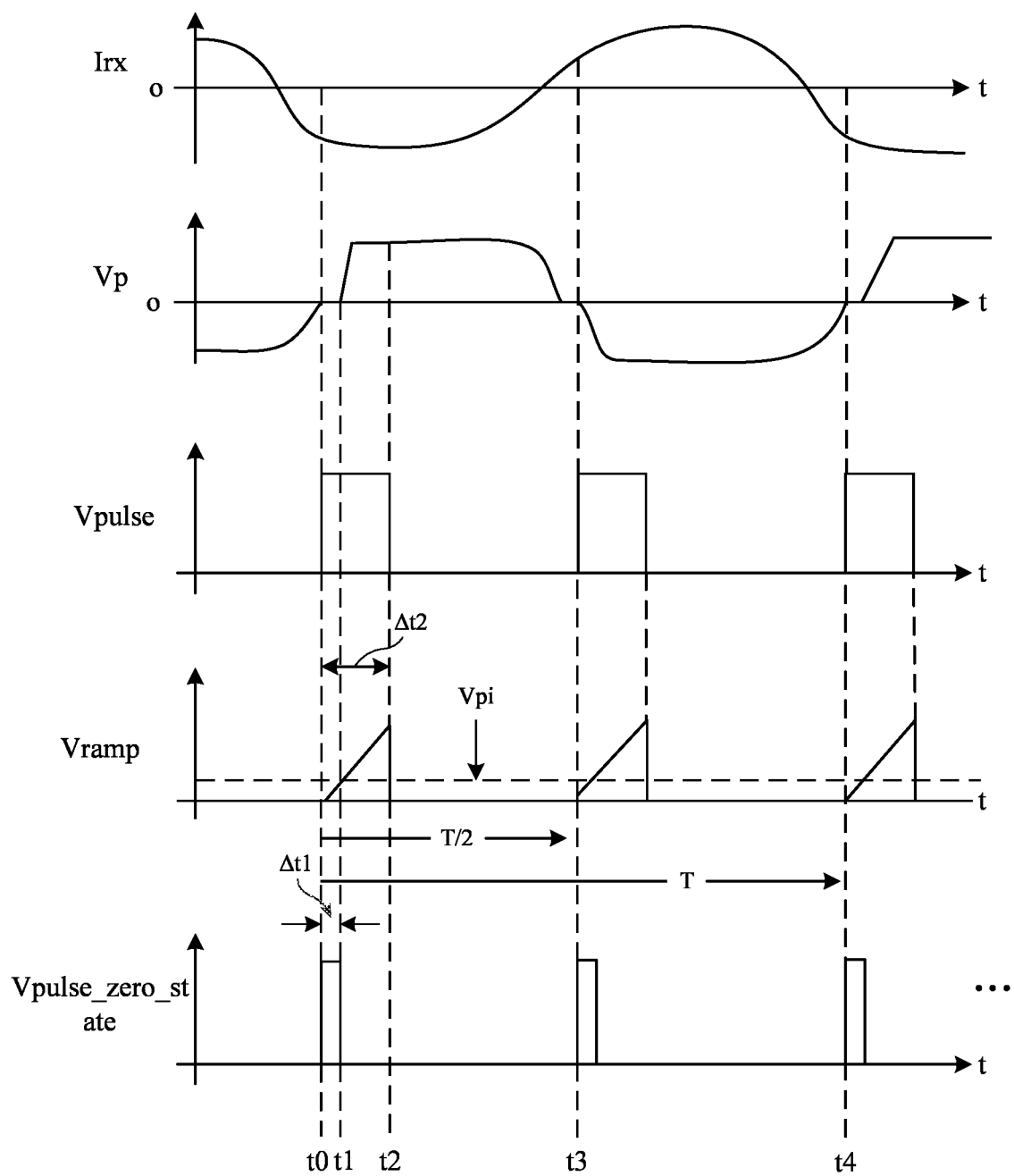
FIG. 4 is a timing diagram showing illustrative signal waveforms involved in operating the voltage regulator circuitry of FIG. 3 in accordance with some embodiments.

Zero crossing detector 106 has a input configured to receive voltage Vp from path 86. During operation of device 24 when coil 48 is receiving wireless power signals 44 from device 12, voltage Vp may toggle between a negative voltage level and a positive voltage level (see, e.g., FIG. 4). For example, voltage Vp might swing between −12 V and +12 V. As shown in FIG. 4, voltage Vp may be inversely related to Irx (i.e., the amount of current flowing through coil 48). Waveforms Irx and Vp may oscillate in accordance with the power carrier frequency of the wireless power/charging signals, which is typically between 110-205 kHz or 80-300 kHz. Frequencies of about 125 kHz, about 128 kHz, about 200 kHz, about 326 kHz, about 360 kHz, at least 80 kHz, at least 100 kHz, less than 500 kHz, less than 300 kHz, or other suitable wireless power frequency are also possible. The periodicity of waveforms Irx and Vp are denoted by time period T.

Zero crossing detector 106 may detect when voltage Vp crosses zero volts (e.g., when Vp exceeds 0 V such as at time t0 or when Vp falls below 0 V such as at time t3). In response detecting a zero crossing, detector 106 may output an asserted signal to pulse generator 108. In response to receiving the asserted output signal from zero crossing detector 106, pulse generator 108 may pulse signal Vpulse. Signal Vpulse may have a rising edge at time t0 and a falling edge at time t2. The total pulse width of signal Vpulse is denoted as time period Δt2. Integrator 110 may receive signal Vpulse and generate a corresponding signal Vramp. Integrator 110 will integrate signal Vpulse, which causes signal Vramp to begin ramping up at time t0. At time t2, signal Vpulse is driven low, which resets signal Vramp down to zero.

Operational amplifier 104 may have a first (+) input configured to receive voltage Vpi from proportional integrating controller 102, a second (−) input configured to receive signal Vramp from integrator 110, and an output on which signal Vpulse_zero_state is generated. signal Vpulse_zero_state may be driven high at time t0 when detector 106 detects a zero crossing. As described above, signal Vramp may being ramping up at time t0. When signal Vramp exceeds Vpi at time t1, operational amplifier 104 may drive signal Vpulse_zero_state low.

The total pulse width of signal Vpulse_zero_state is denoted as time period Δt1. The duration of period Δt1 is less than the duration of period Δt2. Period Δt2 should be carefully selected to minimize the risk of voltage Vrect collapsing. As an example, period Δt2 may be 300 nanoseconds (ns), 200-300 ns, less than 200 ns, greater than 300 ns, 300-400 ns, 400-500 ns, or other suitable duration. Period Δt1 may be 50 ns, 60 ns, 70 ns, 80 ns, 90 ns, 50-100 ns, 10-50 ns, less than 100 ns, less than 90 ns, less than 80 ns, less than 70 ns, or other suitable duration.

Signal Vpulse_zero_state is fed through inverter 122 to logic AND gates 124 and 126, which control the pull-up switches S3 and S4, respectively, within synchronous rectifier 50. Signal Vpulse_zero_state is fed directly to logic OR gates 128 and 130, which control the pull-down switches S1 and S2, respectively, within synchronous rectifier 50. Thus, when signal Vpulse_zero_state is asserted (driven high) during period Δt1, inverter 12 will invert the pulse which causes logic AND gates 124 and 126 to deactivate the pull-up rectifier switches S3 and S4 while logic OR gates 128 and 130 activate the pull-down rectifier switches S1 and S2. The logic AND gates are sometimes referred to as logic gates of a first type, whereas the logic OR gates are sometimes referred to as logic gates of a second type different than the first type.

Since there is a zero crossing every half period, signal Vpulse_zero_state will be asserted every half cycle T/2 to turn on switches S1 and S2. Turning off the pull-up switches S3 and S4 while turning on the pull-down switches S1 and S2 between time t0 and t1 changes the voltage applied to coil 48 from (±Vrect−Vcs) to (0−Vcs), which increases the voltage applied across coil 48 and increases current Irx. Voltage Vcs represents the amount of voltage across series capacitor Cs. This extra energy stored in coil 48 in the form of higher current Irx will be injected into capacitor Crect, which has the effect of boosting rectified voltage Vrect. At time t1 when Vpulse_zero_state is driven low, the control of the rectifier switches S1-S4 is returned to synchronous rectifier controller 120 until the next zero crossing half a cycle later. In other words, voltage regulator 64 overrides the synchronous rectifier controller 120 whenever Vp is equal to zero and relinquishes control as soon as signal Vpulse_zero_state is deasserted (driven low). Synchronous rectifier controller 120 may or may not be considered part of voltage regulator circuitry 64. The duration between time t0 and t1 should be selected to provide a desired amount of boosting and regulation of rectifier voltage Vrect.

Configured and operated in this way, the zero state of voltage Vp is synchronized with the temporary activation of the pull-down MOSFET transistors S1 and S2. Since the voltage across switches S1 and S2 is approximately equal to zero during the zero crossing, a soft switching transition is guaranteed. The extra zero state allows slightly higher energy storage in the magnetic link coils 42 and 48 and dynamically changes the net AC resistance seen by the magnetic interface in a way that keeps voltage Vrect close to the target Vrect-setpoint while the needed Irect is being delivered.

Figure 5:
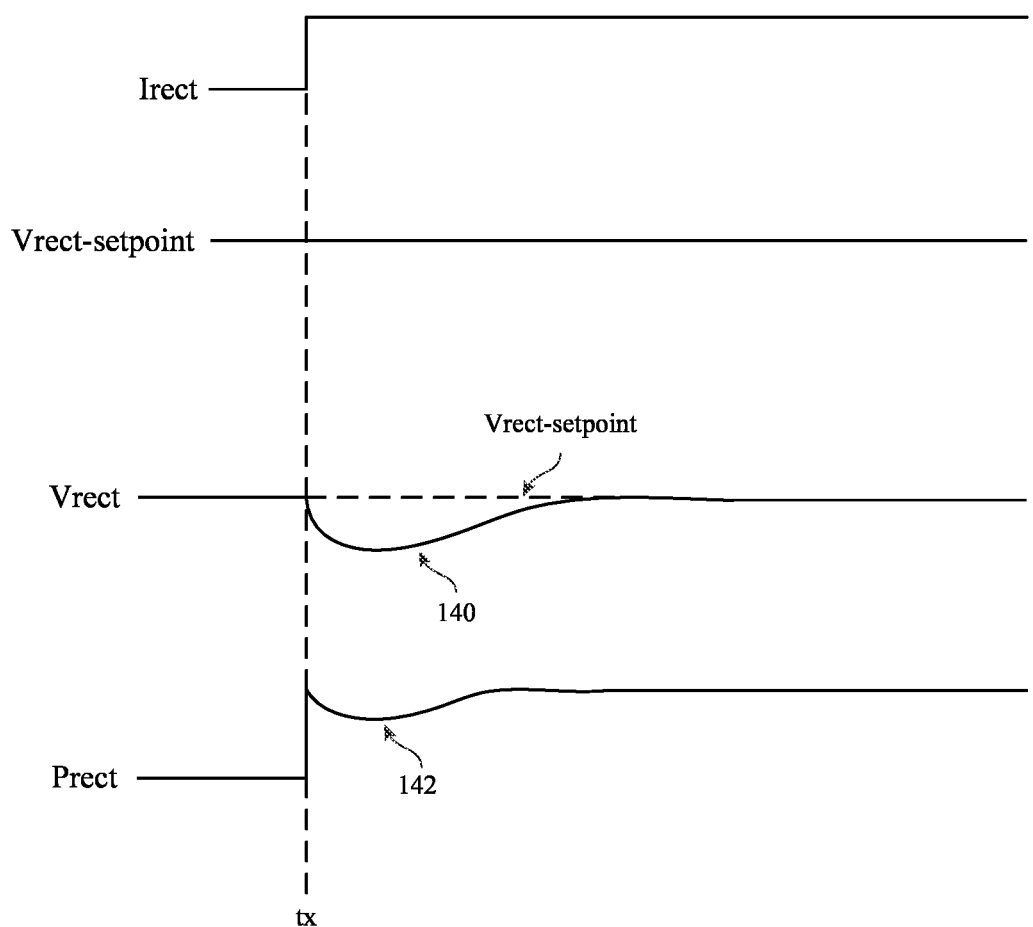
FIG. 5 is a timing diagram showing how rectified power changes in response to a load step change in accordance with some embodiments.

FIG. 5 is a timing diagram showing how rectified power Prect changes in response to a load step change. As shown in FIG. 5, load current Irect steps up at time tx while voltage Vrect-setpoint remains fixed. The load step change can cause rectifier output voltage Vrect to drop (see dip 140), but voltage regulator 64 may drive Vrect back up to the Vrect-setpoint level in less than 1 millisecond (as an example). Regulating Vrect locally using voltage regulator 64 independently from power transmitting device 12 is significantly faster than the CEP feedback mechanism. The speed of voltage regulation provided by voltage regulator 64 may be at least two times faster, four times faster, ten times faster, or hundreds of times faster than that of the CEP feedback loop. The rectified power Prect waveform may initially drop (see dip 142) but will quickly settle to a final power level that is proportional to the change in Irect. This is a desirable behavior of a well-regulated voltage source.

Figure 6:
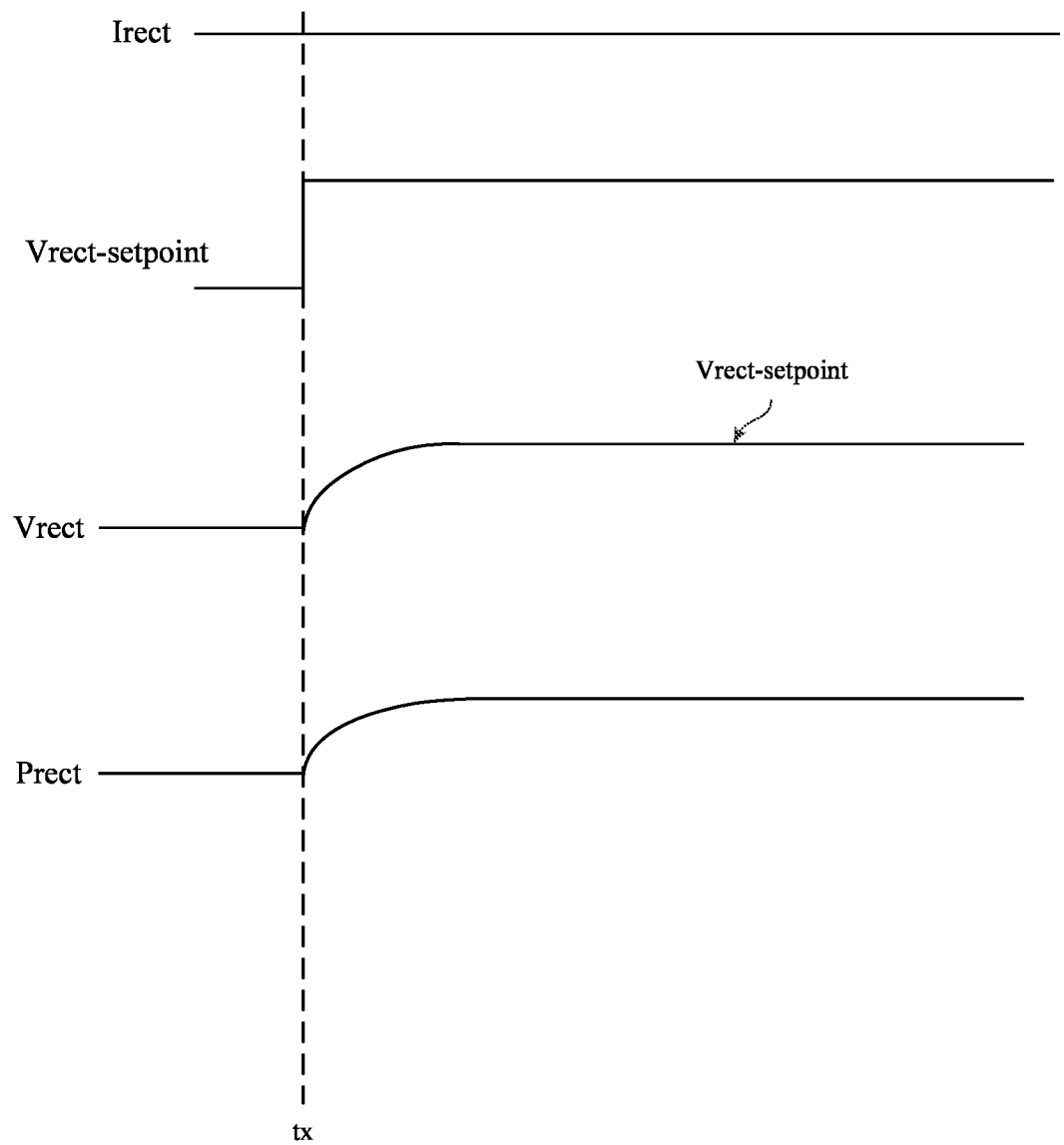
FIG. 6 is a timing diagram showing how rectified power changes in response to a rectified voltage set point adjustment in accordance with some embodiments.

FIG. 6 is a timing diagram showing how rectified power changes in response to an adjustment in voltage Vrect-setpoint. As shown in FIG. 6, voltage Vrect-setpoint is stepped up while load current Irect remains constant. Here, rectified voltage Vrect may settle to the Vrect-setpoint level in less than 1 ms (as an example) while also allowing the changes in Prect and Vrect to be proportional.

Figure 7:
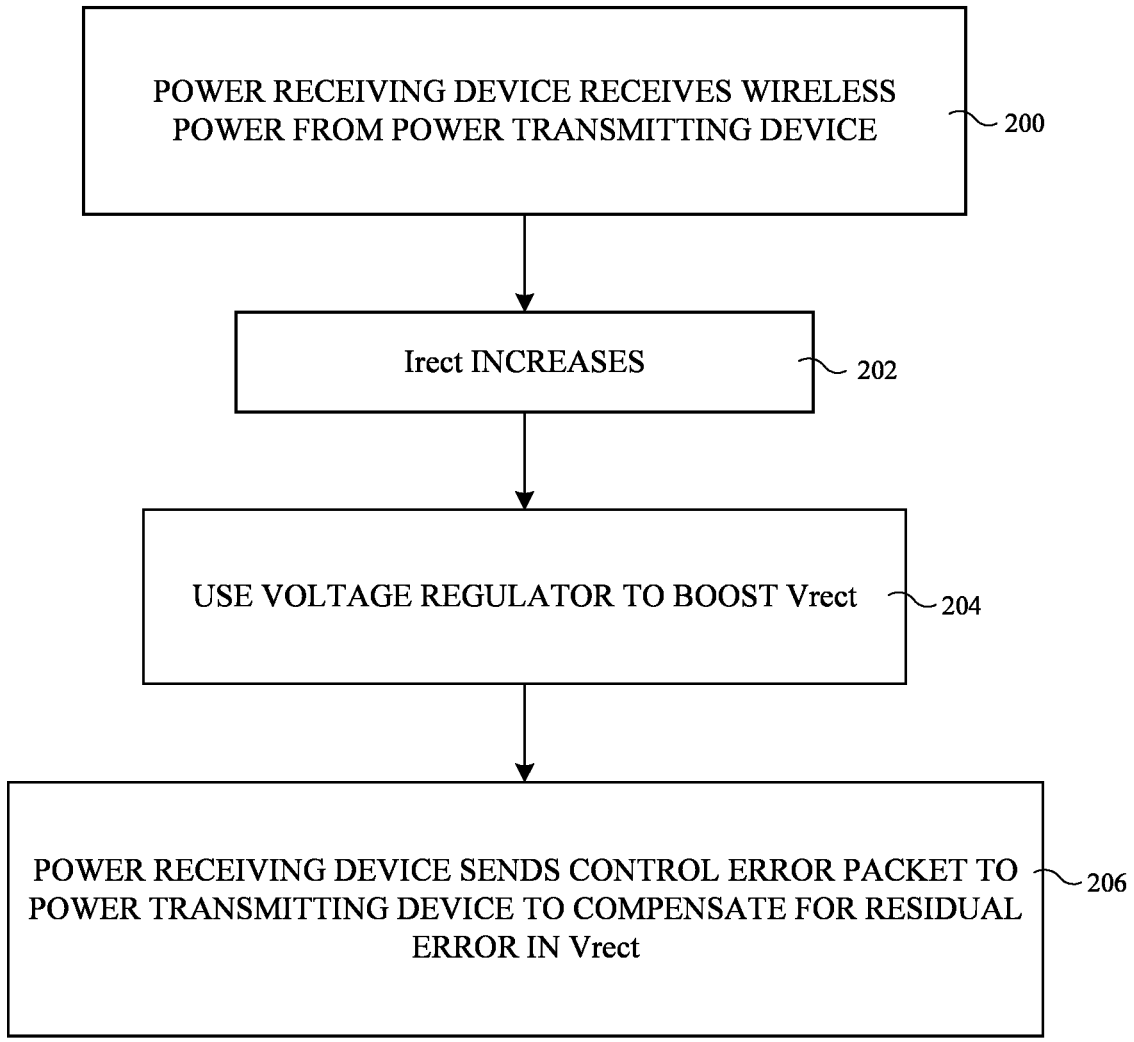
FIG. 7 is a flow chart of illustrative steps for operating a wireless charging system in accordance with some embodiments.

FIG. 7 is a flow chart of illustrative steps for operating wireless charging system 8. At step 200, power receiving device 24 may receive wireless power from power transmitting device 12 (e.g., device 12 may be actively transmitting power to charge device 24).

At step 202, some component within device 24 may be activated to draw load current, which increases Irect. A step change in Irect may cause voltage Vrect to drop. When this occurs, voltage regulator 64 may be automatically activated, at step 204, to boost Vrect (as shown by the example of FIG. 5).

At step 206, power receiving device 24 may send a control error packet via in-band communications to power transmitting device 12 to help compensate for any remaining residual error in voltage Vrect. In other words, voltage regulator 64 and the CEP feedback mechanism can complement one another to compensate for larger changes in Irect where the soft switching duration might not be long enough to allow Vrect to settle back to Vrect-setpoint. Voltage regulator 64 can therefore regulate Vrect during time intervals between successive CEP packets. This increases the deliverable power significantly, which results in faster charging times. The use of voltage regulator 64 also allows for much higher rates of change in load current Irect, which simplifies the design process considerably while increasing the overall reliability of system 8.

The foregoing is merely illustrative and various modifications can be made to the described embodiments. The foregoing embodiments may be implemented individually or in any combination.

What is claimed is:
1. An electronic device comprising:
   a wireless charging coil;
   a rectifier coupled to the wireless charging coil and configured to output a rectifier output voltage; and
   a voltage regulator configured to receive the rectifier output voltage and to temporarily short the wireless charging coil to a power supply line in response to the rectifier transitioning between a first phase during which a voltage across two nodes in the rectifier is positive and a second phase during which the voltage across the two nodes in the rectifier is negative.
2. The electronic device of claim 1, wherein the voltage regulator is further configured to increase the rectifier output voltage by temporarily shorting the wireless charging coil to the power supply line.
3. The electronic device of claim 1, wherein the voltage regulator is further configured to increase a current flowing through the wireless charging coil by temporarily shorting the wireless charging coil to the power supply line.
4. The electronic device of claim 1, wherein the rectifier comprises a plurality of rectifier switches, and wherein the voltage regulator is further configured to temporarily short the wireless charging coil to the power supply line by temporarily activating a subset of the rectifier switches in response to the rectifier transitioning between the first and second phases.
5. The electronic device of claim 1, wherein the rectifier comprises pull-up switches and pull-down switches, and wherein the voltage regulator is further configured to temporarily short the wireless charging coil to the power supply line by temporarily activating the pull-down switches in the rectifier in response to the rectifier transitioning between the first and second phases.
6. The electronic device of claim 1, further comprising:
   a capacitor coupled across the two nodes in the rectifier, wherein the voltage regulator is configured to detect when the rectifier transitions between the first and second phases by detecting when a voltage across the capacitor is equal to zero.
7. The electronic device of claim 1, further comprising:
   a rectifier controller configured to output control signals for controlling a plurality of switches in the rectifier, wherein the voltage regulator is further configured to override the control signals for controlling the plurality of switches in the rectifier when the rectifier transitions between the first and second phases.
8. The electronic device of claim 1, wherein the voltage regulator comprises:
   a pulse generator configured to generate a pulse signal in response to the rectifier transitioning between the first and second phases; and
   an integrator configured to receive the pulse signal and to generate a corresponding ramp signal.
9. The electronic device of claim 8, wherein the voltage regulator further comprises:
   a subtractor configured to receive the rectifier output voltage, to receive a set point voltage, and to generate a corresponding error signal; and
   a proportional integration controller configured to receive the error signal and to generate a proportional integrator output voltage.
10. The electronic device of claim 9, wherein the voltage regulator further comprises:
    an operational amplifier having a first input configured to receive the proportional integrator output voltage, a second input configured to receive the ramp signal, and an output that is coupled to a plurality of switches in the rectifier.
11. A method of operating an electronic device, comprising:

with a wireless charging coil, receiving wireless power from a wireless power transmitting device;

with a rectifier coupled to the wireless charging coil, generating a rectifier output voltage;

with a voltage regulator, receiving the rectifier output voltage and temporarily shorting the wireless charging coil to a power supply line in response to the rectifier transitioning between first and second phases.

12. The method of claim 11, further comprising:

with the voltage regulator, boosting the rectifier output voltage by temporarily shorting the wireless charging coil to the power supply line in response to the rectifier transitioning between the first and second phases.

13. The method of claim 11, further comprising:

with the voltage regulator, increasing a current through the wireless charging coil by temporarily shorting the wireless charging coil to the power supply line in response to the rectifier transitioning between the first and second phases.

14. The method of claim 11, wherein the rectifier comprises a plurality of rectifier switches, the method further comprising:

with the voltage regulator, temporarily shorting the wireless charging coil to the power supply line by activating a subset of the rectifier switches in response to the rectifier transitioning between the first and second phases.

15. The method of claim 11, wherein a capacitor is coupled across two nodes in the rectifier, the method further comprising:

with the voltage regulator, detecting when the rectifier transitions between the first and second phases by detecting when a voltage across the capacitor is equal to zero.

16. An electronic device comprising:

a wireless charging coil;

a rectifier coupled to the wireless charging coil and configured to output a rectifier output voltage; and a voltage regulator configured to receive the rectifier output voltage and to selectively adjust one or more switches in the rectifier in response to the rectifier transitioning between first and second phases.

17. The electronic device of claim 16, wherein the rectifier comprises pull-up switches and pull-down switches, and wherein the voltage regulator is further configured to activate the pull-down switches in response to the rectifier transitioning between the first and second phases.

18. The electronic device of claim 16, wherein the voltage regulator is further configured to temporarily short the wireless charging coil to ground by selectively adjusting one or more switches in the rectifier in response to the rectifier transitioning between the first and second phases.

19. The electronic device of claim 16, wherein the voltage regulator is further configured to boost the rectifier output voltage by selectively adjusting one or more switches in the rectifier in response to the rectifier transitioning between the first and second phases.

20. The electronic device of claim 16, further comprising:

a capacitor coupled across two nodes in the rectifier, wherein the voltage regulator is configured to detect when the rectifier transitions between the first and second phases by detecting when a voltage across the capacitor is equal to zero.

* * * * *